2,847,471
METHOD FOR PURIFYING TETRACYCLINE

John Vandeputte, Milltown, and Leon J. Heuser, Princeton, N. J., assignors to Olin Mathieson Chemical Corporation, New York, N. Y., a corporation of Virginia No Drawing. Application March 4, 1955
Serial No. 492,295

6 Claims. (Cl. 260—559)

This invention relates to methods of purifying antibiotics, and more particularly to a method for isolating tetracycline from a fermentation broth or other aqueous medium containing the antibiotic.

Prior to this invention, it had been shown that a potent antibiotic, called tetracycline, is present in the culture liquids obtained when suitable strains of certain Streptomyces species are grown in or on liquid nutrient media (of, for example, Minieri et al., Antibiotic Annual, 1953–1954, 81–87; and U. S. patent application of Donovick, et al., Serial No. 443,952, filed July 16, 1954, now abandoned). It was further known that when tetracycline is produced by a fermentation process, the tetracycline formed is mixed with various (solid and liquid) genetic contaminants, often including a second antibiotic, chlortetracycline, formed concurrently. Before this invention, however, no simple and efficient method was known for separating the tetracycline from the solids (e. g. the mycelia, spores, and other sedimentable solids), other antibiotics concurrently formed, and inactive materials in the culture medium.

An object of this invention, therefore, is the provision of an improved method of recovering tetracycline from a fermentation broth containing it and genetic contaminants.

Another object of this invention is the provision of a method of separating tetracycline from other antibiotics produced concurrently in a fermentation process utilizing a tetracycline-producing Streptomyces.

Still another object of this invention is the provision of a method of separating tetracycline from inactive impurities present in a culture filtrate which has previously been separated from the culture medium in a fermentation process involving a tetracycline-producing Streptomyces.

These objects are achieved by the method of this invention, which essentially comprises adsorbing tetracycline from a filtrate of a culture of a tetracycline-producing Streptomyces by treating the filtrate with an inorganic metal compound, and then recovering the tetracycline from the compound. The inorganic metal compounds useful in the practice of this invention are the relatively water-insoluble salts or bases (compounds having a solubility in water of less than about 0.005 gram compound per ml. water) of a polyvalent light metal, such as a light metal selected from the groups IIA and IIIB of Mendeleeff's periodic table. Metals whose salts and/or bases fulfill the above requirements include, inter alia, calcium, strontium, barium, and aluminum. Examples of inorganic metal compounds suitable for the purposes of this invention include the salts and bases of the alkaline earth metals [group IIA] (e. g. calcium sulfate, calcium carbonate, strontium sulfate, barium sulfate, barium carbonate and calcium oxide) and the salts and oxides of the non-heavy metals of group IIIA (e. g. aluminum oxide). Of these, calcium sulfate is preferred. The salts and bases must not be highly water soluble, since the operability of the process depends on the ability of particles of the inorganic metal compounds to adsorb and thereby remove the tetracycline from an aqueous medium. Throughout the specification and claims this ability of particles of the inorganic metal compounds to remove the tetracycline is referred to as an "adsorption," but we do not wish to be limited to any particular theory for the phenomenon; accordingly, the term "adsorption" is to be understood to include complex-formation, occlusion, or any other mechanism whereby the tetracycline is tied up with the inorganic metal compound and thereby removed from solution.

Preparatory to the addition of the inorganic metal compound, the whole culture (broth) of a tetracycline-producing Streptomyes is acidified to a pH of less than about 2.5 (preferably about 2) with an acid such as hydrochloric acid, and the culture liquid is removed from the residual culture solids, as by filtering or centrifuging. The acidified culture filtrate, which contains the main portion of the tetracycline in the broth, is then treated with the inorganic metal compound. Either after, with, or prior to, the addition of the inorganic metal compound, the pH of the culture filtrate is adjusted to the basic side, preferably to a range of about 9 to 10 (optimally about 9.5), by treatment with a base, such as an alkali metal base (e. g. sodium hydroxide); and the resulting mixture is then filtered to separate the undissolved inorganic metal compound and adsorbed tetracycline from the soluble inactive impurities in the culture filtrate. This insoluble association of inorganic metal compound and tetracycline, which usually contains some water, will be referred to hereinafter as "the wet cake." The proportion of inorganic metal compound to filtrate is not critical; but to insure complete adsorption of tetracycline, at least 1% by weight of compound per volume of filtrate should be employed. This step in the process, as well as all subsequent steps, can be carried out at normal temperatures such as ambient temperature. In order to prevent any possible decomposition of the tetracycline, however, the temperature should not be permitted to rise above about 35° C.

The tetracycline is recovered from the wet cake by elution therefrom. This elution is accomplished by slurrying the wet cake in an organic solvent to form a slurry of wet organic solvent, the inorganic metal compound and tetracycline. By "wet organic solvent" is meant a mixture of a solvent and water wherein the water is present in the range of 5% to 50% v./v. based on the total mixture, the requisite moisture usually being supplied by the water content of the wet cake. Suitable organic solvents utilizable in this step of the process are those wherein tetracycline is soluble, and include alcohols, such as alkanols (e. g. methanol, isopropanol, butanol, and pentasol), ketones, such as acetone and the cellosolves (e. g. methyl and ethyl), and esters such as the alkyl esters of lower fatty acids (e. g. amyl acetate). For this elution step, the pH of the slurry is adjusted to an acid value by means of an acid, such as a mineral acid (e. g. hydrochloric acid, sulfuric acid, and nitric acid). By this procedure, the tetracycline is desorbed from the inorganic metal compound and passes into solution in the wet organic solvent.

To precipitate the metal cation of the adsorbing salt or base, the acid used in adjusting the pH of the slurry to said acid value is so chosen that the anion of the acid forms a salt with the metal cation which is insoluble in the wet solvent at the pH of the solution. Thus, if a water-immiscible solvent, such as butanol or pentasol, is used as the organic solvent, and a calcium salt or base is used as the inorganic metal compound, then by adjusting the slurry to a pH in the range of about 1.5 to 2.5 (preferably about 2) with sulfuric acid, insoluble calcium sulfate is formed, which may be removed by filtration and can thereafter be recovered and reused in the purification.

and separation of tetracycline from a subsequent batch of culture filtrate. This alternative in the process is illustrated by Example 1. It should be noted, however, that this specific process is merely exemplary, and it will be obvious to one skilled in the art which acid and organic solvent should be used, depending on the nature of the inorganic metal compound used to adsorb the tetracycline.

If a water-miscible solvent, such as methanol, ethanol, isopropanol, or acetone, is used as the organic solvent, and a calcium salt or base is used as the inorganic metal compound, then by adjusting the slurry to a pH in the range of about 1.5 to 2.5 (preferably about 2) with sulfuric acid, most of the calcium sulfate precipitates and can be removed by filtration. Some of the calcium ion, however, remains in solution; and this residual amount can be removed by forming a different salt of calcium, which is more insoluble in the wet organic solvent, as by treatment with oxalic acid or a salt thereof (and, if necessary, adjusting the pH) to precipitate the remaining calcium ion as calcium oxalate. This alternative in the process is illustrated by Example 2. It should be noted here also, that the specific process is merely exemplary; and it will be obvious to one skilled in the art as to which alternative inorganic compounds, acids, and organic solvents may be used.

The wet organic solvent solution (filtrate), freed of the cation of the inorganic compound, is then adjusted to a pH of about 4 to 4.5 (preferably about 4.2) by the addition of a base such as sodium hydroxide (and, if necessary, water), to precipitate the tetracycline as the free base. The precipitate is then recovered by filtration.

The tetracycline can be further purified and converted to an acid-solution salt by dissolving the base in a wet organic solvent, such as butanol, and treating the solution with the desired acid to a pH of about 1.5 to 2.5 (preferably about 2). The water and a portion of the organic solvent are removed by azeotropic distillation under vacuum; and upon cooling to say 5° C., the acid-addition salt of tetracycline is recovered as a precipitate.

By the practice of this invention, not only is tetracycline isolated from the inactive impurities normally found in a fermentation broth but also from any chlortetracycline which may have been produced during fermentation. This separation is made possible because chlortetracycline is more soluble in the organic solvents used in the processes of this invention than is tetracycline, so that a substantial proportion of the chlortetracycline remains in solution as the tetracycline is precipitated therefrom. Another advantage of this process resides in the fact that throughout most of the treatment, the pH of the tetracycline-containing mixture is on the basic side. Tetracycline is more stable in a basic medium than in an acid medium, wherein it tends to dehydrate to anhydrotetracycline. This added advantage permits a larger recovery of tetracycline with consequent decrease in conversion of tetracycline to anhydrotetracycline. Furthermore, since chlortetracycline is relatively unstable in a highly basic medium, a substantial portion thereof is destroyed in the practice of the method this invention.

The following examples are illustrative of the invention:

*Example 1*

One liter of a whole fermentation broth assaying 1200 u./ml. for tetracycline is adjusted to pH 2 using hydrochloric acid. After stirring for 15 minutes, the broth is filtered; and to the acid filtrate is added 10 g. finely divided calcium sulfate. The pH of the mixture is raised to 9.5 with sodium hydroxide, and the mixture is stirred for one-half hour. The wet calcium sulfate cake formed is filtered off, leaving a spent filtrate assaying 50 u./ml. for tetracycline (thereby showing that 95% of the activity was adsorbed). The wet calcium sulfate cake containing the adsorbed tetracycline is then slurried in 100 ml. butanol, the pH is lowered to 2 with concentrated sulfuric acid, the mixture is stirred for one-half hour, and the insolubles are then filtered off. The spent calcium sulfate cake retains about 2% of the activity. To the butanol filtrate is then added 20 ml. water, and the pH is raised with stirring to 4.2 using a sodium hydroxide solution. After stirring two to three hours, the precipitated tetracycline base is filtered off and dried. The product weighs about 0.98 g. and assays 780 u./mg. for tetracycline, thereby representing a yield of about 64%.

*Example 2*

One liter of whole fermentation broth assaying 1050 u./ml. for tetracycline is acidified to pH 2, filtered, 10 g. calcium sulfate is added, the pH is raised to 9.5, the mixture is stirred for one-half hour, and the insolubles filtered off. The spent filtrate assays 62 u./ml. for tetracycline, indicating that 94% of the activity is adsorbed. The wet calcium sulfate cake is then slurried in 30 ml. 70% aqueous acetone, the pH lowered to 2 with sulfuric acid, and the mixture is stirred for one-half hour and filtered. The spent calcium sulfate insolubles contain about 4% of the activity. To the filtrate is added 0.2 g. ammonium oxalate, the pH is adjusted to 3 with sodium hydroxide, and the precipitate of calcium oxalate is filtered off. The pH of the filtrate is then raised to 4.2 by addition of sodium hydroxide, stirred three or four hours, and the precipitated tetracycline base filtered off and dried. The product weighs about 0.84 g. and assays 720 u./mg. for tetracycline, thereby representing a yield of about 59%.

*Example 3*

The crude tetracycline base formed by the procedure of either Example 1 or 2 can be purified and converted to its hydrochloride by dissolving 1 g. of the base in 26 ml. water-saturated butanol, and adjusting the pH to 2 by addition of concentrated hydrochloric acid. After stirring one-half hour, the insolubles are filtered off and the filtrate vacuum-distilled to a volume of 5 ml. On standing in a cold room, the hydrochloride of tetracycline precipitates and is filtered off, washed with a 50% butanol-50% hexane solution, then hexane alone and dried. The yield amounts to about 65–70% of a product assaying about 900–920 u./mg.

The invention may be variously otherwise embodied within the scope of the appended claims.

We claim:

1. A method of isolating tetracycline from a fermentation broth containing the same and appreciable quantities of chlortetracycline, which comprises acidifying said broth; filtering the broth; treating the filtrate with an inorganic metal compound selected from the group consisting of the relatively water-insoluble salts and bases of the light metals of groups IIA and IIIB of the periodic table at a pH in the range of about 9 to about 10, said compound being present in a concentration greater than about 0.005 gram of compound per milliliter of filtrate, whereby an insoluble association of tetracycline and inorganic compound precipitates; separating the precipitate; mixing the precipitate with an organic solvent for tetracycline thereby forming a mixture comprising water, organic solvent, inorganic metal compound and tetracycline; acidifying the mixture to a pH in the range of about 1.5 to about 2.5 with an acid which forms an insoluble salt with the cation of the inorganic metal compound in said solvent at said acid pH; removing the insoluble salt; and recovering the tetracycline from the solvent by adjusting the pH thereof to the range of about 4 to about 4.5, whereby tetracycline precipitates.

2. The method of claim 1 wherein the inorganic metal compound is calcium sulfate.

3. The method of claim 1 wherein the solvent is butanol.

4. The method of claim 3 wherein the inorganic metal compound is calcium sulfate and the acid is sulfuric acid.

5. A method of isolating tetracycline from a fermentation broth containing the same and appreciable quantities of chlortetracycline, which comprises acidifying said broth; filtering the broth; treating the filtrate with an inorganic relatively water-insoluble calcium salt at a pH in the range of about 9 to about 10, said compound being present in a concentration greater than about 0.005 gram of compound per milliliter of filtrate whereby an insoluble association of tetracycline and calcium compound precipitates; separating the precipitate; mixing the precipitate with a water-miscible organic solvent for tetracycline thereby forming a mixture comprising water, organic solvent, calcium compound and tetracycline; acidifying the mixture to a pH in the range of about 1.5 to about 2.5 with an acid which forms an insoluble salt with calcium in said solvent at said acid pH; removing the insoluble salt; treating the remaining solution with a compound selected from the group consisting of oxalic acid and salts thereof to precipitate any remaining calcium ion as calcium oxalate; removing the precipitate; and recovering the tetracycline from the solvent by adjusting the pH thereof to the range of about 4 to about 4.5, whereby tetracycline precipitates.

6. The method of claim 5 wherein the solvent is acetone and the acid is sulfuric acid.

References Cited in the file of this patent

UNITED STATES PATENTS

| | | |
|---|---|---|
| 2,609,329 | Niedercorn | Sept. 2, 1952 |
| 2,640,842 | Weidenheimer et al. | June 2, 1953 |
| 2,655,535 | Pidacks et al. | Oct. 13, 1953 |
| 2,658,077 | Harms | Nov. 3, 1953 |
| 2,699,054 | Conover | Jan. 11, 1955 |
| 2,739,924 | Lein et. al. | Mar. 27, 1956 |
| 2,804,476 | Bogert | Aug. 27, 1957 |

FOREIGN PATENTS

| | | |
|---|---|---|
| 497,340 | Canada | Nov. 3, 1953 |
| 497,485 | Canada | Nov. 3, 1953 |
| 504,172 | Canada | July 6, 1953 |

OTHER REFERENCES

Bird, et al.: "Antibiotics and Chemotherapy," vol. 4, No. 7, July 1954 (received Feb. 8, 1954), page 750.